INVENTOR.
ALMON N. FENTON

Feb. 15, 1966

A. N. FENTON

METHOD FOR ELECTRONICALLY GATING AN INTELLIGENCE-CARRYING SIGNAL 3,235,808

Filed July 30, 1964

2 Sheets-Sheet 2

INVENTOR.
ALMON N. FENTON 3,235,808

METHOD FOR ELECTRONICALLY GATING AN INTELLIGENCE-CARRYING SIGNAL

Almon N. Fenton, Playa Del Rey, Calif.
(13338 Del Monte Drive, Apt. 3J, Seal Beach, Calif.)

Filed July 30, 1964, Ser. No. 386,455
3 Claims. (Cl. 328—150)

This is a continuation-in-part of application Serial No. 15,307, filed March 16, 1960, now abandoned.

The present invention, in one preferred form, comprises a method of gating a signal (which is usually an intelligence-carrying signal such as a sound recording signal, or the like, although not specifically so limited) comprising splitting the signal into two portions, opposing said portions to each other in greater or lesser degree (in one preferred form, in equal degree) whereby to bring about either complete or partial neutralization thereof and controllably eliminating by an electronic gate-operating step, in response to receipt of a threshold control signal, one of said opposed signal portions, thus allowing the other signal portion to be unopposed and to be available for utilization as an output signal.

In one preferred form of the invention, the two opposed signal portions are of equal magnitude of 180 degree opposed out-of-phase relationship normally in the absence of the threshold control signal, thus effecting complete cancellation of the two opposed signal portions in a manner leaving a zero net output signal until such time as the threshold control signal is received and effectively brings about the electronic gate-operating step (in this form of the invention comprising an electronic gate-opening step) whereby to eliminate one of said two equal and 180-degree out-of-phase signal portions, thus allowing the other signal portion to be unopposed and to be available for utilization as an output signal—for example, a sound recording signal, or the like.

One specific application of the method of the present invention is in the field of sound recording where it may be employed for electronically gating sound recording signals in a manner such as to normally gatingly through-pass the intelligence-carrying signal only when a threshold control signal (which is usually the input intelligence-carrying signal, although not specifically so limited) exceeds a predetermined threshold magnitude. In other words, this specific application of the invention can be said to comprise a method for gating signals whereby to pass said signals only when in excess of a predetermined threshold magnitude.

The present invention also comprises various modifications and/or subcombinations of the method steps of the complete invention referred to above.

The method steps of the present invention may be performed through the use of various different types of apparatus. However, for illustrative purposes, certain specific exemplary forms of apparatus which may be used in practicing the invention are illustrated in the accompanying drawings and will be described for exemplary purposes hereinafter. It should be clearly understood that this is done for convenience and simplicity only and that a novel combination of method steps is the primary disclosure made therein and that the specific apparatus described and illustrated hereinafter is not to be construed in a limiting sense but is exemplary merely of one form of the several different forms of apparatus which can be employed in practicing the method of the present invention.

Therefore, all comments hereinafter pertaining to the apparatus are to be read and understood in this light as primarily relating to the method steps implicit in said descriptive material.

Sound recording has been considerably interfered with at times by unwanted sounds from extraneous sources, said sounds usually being of a lower volume level than the sound which it is desired to record. However, such low level extraneous sounds can be very objectionable and render the sound recording virtually unusable. This is particularly true in the motion picture sound recording field where a low level background sound, such as the drone of an airplane engine, or the like, may be recorded between higher level spoken dialog passages of a scene which was supposed to have occured long before airplanes were invented, thus producing a complete anachronism in the sound track and rendering it unusable.

I am aware of the fact that various prior art devices adapted to minimize such extraneous low level sound below a predetermined threshold volume level have been invented and developed heretofore. However, all such prior art devices known to me have had definite limitations and major disadvantages such as the production of substantial distortion in the sound recording, high harmonic generation, and delay in operation either at the start or the finish of the recording of any single desired sound passage, or both.

The present invention overcomes the above-mentioned prior art limitations and disadvantages and makes it possible to have a good high-quality sound recording of all wanted material above an established threshold volume level. This is accomplished in the present invention by virtually instantaneous action of a high frequency bias which is triggered at a predetermined threshold level of an input sound recording signal. This bias may be made to activate a unilateral device, such as an electron tube, transistor, or the like. The high frequency bias is of a frequency above audibility whereby it may be used without the necessity of time delay circuits in the undesirable manner of prior art threshold type devices, as referred to hereinbefore. The high frequency bias may directly activate the unilateral device, or may deactivate a countering device, thus allowing passage of the desired sound recording signal above a predetermined threshold magnitude.

In general, the electronic gating apparatus of the present invention may be said to comprise electric circuit means defining a first signal-carrying channel (usually a sound-recording signal-carrying channel) and electric circuit means defining a second signal-carrying channel (usually a sound-recording signal-carrying channel), with said first channel and said second channel having input terminal means thereto adapted to receive a signal which is to be suppressed when below said predetermined threshold magnitude and which is to be through-passed when above said predetermined threshold magnitude, and with said second channel having output terminal means adapted to be connected to further apparatus, such as the actual recording head of sound recording equipment (whether optical, magnetic, or mechanical, or the like). It will be understood that conventionally the input terminal means may be connected by way of a preamplifier to a sound transducer such as a microphone, or the like. The second channel includes normally closed electronic gate means and gate-opening means adapted to open the gate means in response to gate-opening signal means received from the first channel. The first channel includes gate-opening signal-producing means coupled to the gate-opening means in the second channel and adapted to produce a gate-opening signal when an input signal received by the input terminal means (of the first channel) exceeds a predetermined threshold magnitude.

In one preferred form of the invention, the electronic gate means mentioned generally above comprises signal splitting and signal bucking or opposing means adapted to effectively split a signal into two equal opposing portions and to oppose them to each other whereby to effectively cancel same. Also, in this preferred form, the gate-opening means may comprise a unilateral non-linear electron passing means (such as electron tube means, transistor means, or the like) for inactivating and preventing the passage of one portion of the split signal through said signal splitting and signal bucking or opposing means, thereby allowing the other portion thereof to pass unopposed through the gate means to the output terminal means of the second channel.

In one preferred form of the invention, the gate-opening signal producing means referred to generally above may comprise a normally inactive and effectively inoperable high frequency bias signal-producing generator means (usually a monostable multivibrator means) adapted to produce a biasing signal (in one preferred form, a pulsating D.C. biasing signal) of a high frequency (above the audibility range in the case of a sound recording signal) as a result of triggered actuation of said signal-producing generator means in response to an input signal to said input terminal means (of said first channel) in excess of a predetermined magnitude. In this preferred form of the invention, the first channel may include triggering means for initiating operation of the high frequency bias signal-producing generator means in response to receipt by said triggering means of a signal in excess of a predetermined magnitude. In one specific preferred form, said triggering means may comprise a pair of balanced back-biased unilateral electron passing devices (such as diodes, or the like) adapted to prevent the passage of a signal until it exceeds said predetermined magnitude, and additionally including a subsequent frequency multiplying means adapted to couple the negative-going portion of the output thereof to the high frequency bias signal-producing generator means in a manner immediately initiating operation thereof whereby to immediately cause the gate-opening means to effectively open the gate means in the second channel so as to immediately pass a signal exceeding said predetermined magnitude through the second channel to the output terminal means thereof.

In the preferred form referred to above, the two opposing circuit portions of the signal splitting and signal bucking or opposing means may include unilateral non-linear electron tube means, or the like, arranged to cancel changes occurring in one of said opposing circuit portions but allowing any changes in the other of said opposing circuit portions to pass through unaltered.

In the preferred form referred to above, the circuits comprising the signal splitting and signal bucking or opposing means may include unilateral electron tube means, or the like, and circuit connections effectively cancelling out any changes in a circuit portion thereof common to both sides of the opposing circuits.

It should also be noted that the present invention additionally comprises the method steps involved in the se- A preferred form of the present invention can be said to have two channels of the types generally referred to hereinbefore for the incoming information, with one channel operating an activating circuit and the second or gated channel passing the information through unaltered when activated by the activating circuit of the first channel. The first channel amplifies the information in normal, substantially conventional amplifying circuits but does not pass anything through until a predetermined level is reached. This level is established by two back-biased diodes in a balanced circuit, which is coupled to an amplifying stage in a frequency doubling circuit where, after amplification, the frequency doubled signal triggers a monostable multivibrator. This monostable multivibrator is a high frequency operating circuit (usually about 60 kc.) which continues to operate as long as a negative voltage is impressed on the input thereto. The pulsating D.C. voltage developed across the plate resistance of the normally non-operating tube of the multivibrator furnishes the bias which makes one of the tubes in the second channel's signal splitting or signal bucking and opposing amplifier means inoperative, thus allowing the other tube to pass the information along unaltered to the output terminal means of the second channel.

By doubling the frequency of the incoming signal and using the negative-going portion to activate the multivibrator, it is possible to anticipate the signal after the first impulse, as shown at the bottom of FIG. 5, so as to eliminate any possible distortion or clipping at the start of each impulse or each passage of signal which it is desired to record. This action is so fast after the first impulse, as shown at the bottom of FIG. 5, that no operation of the gate is discernible. The sudden change in the grid circuit of the opposing tube of the signal splitting, bucking, or opposing amplifier means of the second channel is balanced out by a like tube in the opposite side of the circuit having the same time constant in the grid circuit thereof. Thus, any disturbance in this common grid biasing circuit does not get to the output terminal means of the second channel.

By careful design and balancing of the circuits, only the desired information above an established threshold level is present in the output and without any substantial measure of distortion, harmonic generation or signal clipping at the beginning and/or ending of recorded passages, occurring.

It is an object of the present invention to provide novel electronic gating apparatus for an input signal adapted to be in gate-open signal-passing condition only when an input signal exceeds a predetermined threshold magnitude.

It is a further object to provide a novel method for gating input signals whereby to pass said signals only when in excess of a predetermined threshold magnitude.

It is a further object to provide novel electronic gating apparatus of the type referred to above, including novel high frequency biasing means adapted to render inoperative one portion of signal splitting and signal bucking means whereby to allow the other portion thereof to pass a split signal unopposed therethrough to output terminal means whenever the input signal to said gating apparatus is above a predetermined magnitude.

It is a further object to provide apparatus of the character set forth above wherein the high frequency bias signal is produced by generator or multivibrator means in response to triggered actuation thereof produced by triggering means comprising a pair of balanced back-biased unilateral devices adapted to prevent the passage of a signal until it exceeds a predetermined magnitude.

It is a further object to provide apparatus of the character set forth in the preceding object, wherein the triggering means additionally includes a subsequent frequency multiplying means adapted to couple the negative-going portion of the output thereof to the high frequency bias signal-producing generator means in a manner immediately initiating operation thereof whereby to bring about immediate gate-opening action of the gate means so as to avoid distortion of a desired recorded passage at the beginning and/or end thereof.

It is a further object to provide various novel method steps corollary to the apparatus and various portions thereof set forth hereinabove.

It is a further object to provide apparatus and/or method of the character set forth in any of the preceding objects which is of exceedingly simple, relatively inexpensive, foolproof and easy-to-operate nature, such as to be conductive to widespread use thereof.

Other and allied objects will be apparent to those skilled in the art after a careful study hereof.

For the purpose of clarifying the nature of the present invention in both apparatus and method aspects, one exemplary embodiment is illustrated in the hereinbelow-described figures of the accompanying drawings and is described in detail hereinafter. It should be noted that an alternate coupling between the triggering means (including the frequency doubling means) and the high frequency bias signal-producing generator means is illustrated.

Figure 1:
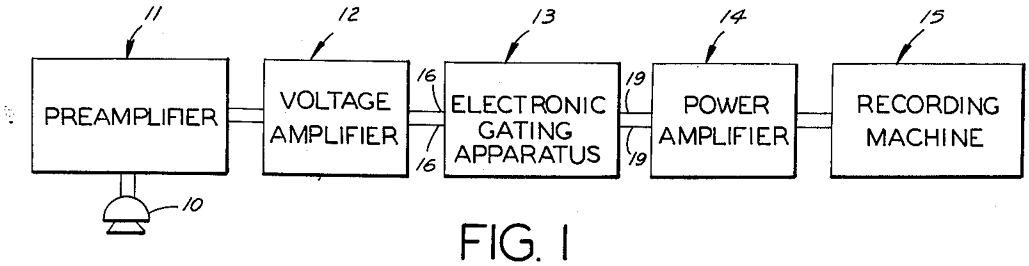
FIG. 1 is a block diagram view illustrating an exemplary complete sound recording system having the electronic gating apparatus of the present invention connected thereinto.

FIG. 1 shows a complete sound recording system including a microphone 10 connected to a preamplifier 11, which is connected to voltage amplifier 12, which is connected to the electronic gating apparatus of the present invention, indicated at 13, which in turn is connected to the power amplifier 14, which in turn is connected to the actual recording machine or apparatus whether of optical type, magnetic type, mechanical type, or the like, indicated in block form at 15.

Figure 2:
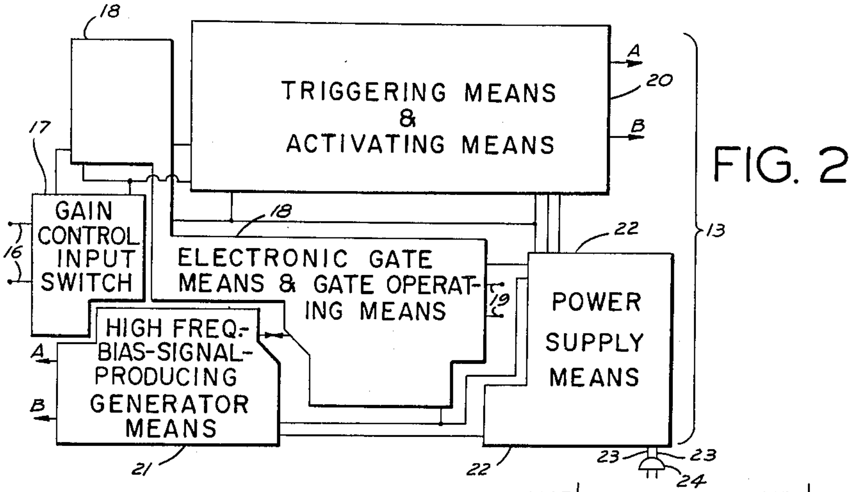
FIG. 2 is a block diagrammatic view showing various exemplary elements of one exemplary form of the electronic gating apparatus of the present invention.

FIG. 2 illustrates, in block diagram form, the electronic gating apparatus 13 of FIG. 1. This specific exemplary embodiment of the electronic gating apparatus 13 is shown as including an input terminal means 16 connected to a gain control input switch 17 of a conventional type, which in turn is connected to electronic gate means and gate-opening means, indicated in block diagram form at 18, which in turn is provided with output terminal means 19 adapted to be connected to the remainder of the complete sound recording apparatus. In other words, the voltage amplifier 12 shown in FIG. 1 is adapted to be connected with respect to the input terminal means 16 and the power amplifier 14 shown in FIG. 1 is adapted to be connected with respect to the output terminal means 19. The input terminal means 16, the gain control input switch means 17, the combination electronic gate means and gate-opening means 18, and the output terminal means 19 effectively comprise electric circuit means defining a second sound-recording signal-carrying channel having the input end 16 and the output end 19. The input terminal means 16 and the gain control input switch means 17 are also connected to triggering means or activating means indicated at 20, which in turn is connected to high frequency bias signal-producing generator means indicated in block form at 21. It should be clearly noted that the triggering or activating means 20 together with the high frequency bias signal-producing generator means 21 together comprise gate-opening signal-producing means adapted to effectively activate the gate-opening means of 18 whereby to open the electronic gate means of 18 in a manner such as to effectively pass an intelligence-carrying input signal received by the input terminal means 16 through the gain control switch means 17, the electronic gate means embodied in 18 to the output terminal means 19 whenever said input signal is above a predetermined magnitude determined by the level or setting of the triggering means contained in 20.

It should be noted that said input signal may be said to comprise an intelligence-carrying signal of substantial bandwidth as determined by the bandwidth requirements for an electrical signal corresponding to a sound passage or as determined by the bandwidth requirements for an acousto-electrically transduced sound passage which is adapted to be effectively through-passed or caused to be in through-passing relationship with respect to said electronic gate means when above a predetermined magnitude. For example, a motion picture sound recording of spoken dialog passages is inherently such an intelligence-carrying signal of substantial bandwidth (approximately 50 to 12,000 cycles). The foregoing may be said to comprise a method step of through-passing said intelligence-carrying signal of substantial bandwidth, as referred to in the preceding sentence, whenever it is above a predetermined magnitude determined by the level or setting of the triggering means set forth in the block diagram element shown at 20 in FIGS. 2 and 3. It should be understood that the expression, "through-passing," as used herein, is intended to mean the passing of said intelligence-carrying signal of substantial bandwidth completely through said electronic gate means from the input end thereof to the output end thereof. It should be clearly noted that the input terminal means 16, the gain control input switch means 17, the triggering means or activating means 20 and the high frequency bias signal-producing generator means 21 together comprise electric circuit means defining a first channel, with its output end connected to the gate-opening means embodied in 18 for operating the electronic gate means also embodied in 18. Power supply means for the entire electronic gating apparatus is indicated in block diagram form at 22 and is adapted to be supplied from an electric cord 23 provided with a plug 24 normally adapted to be connected to a suitable electrical outlet, although the invention is not limited to this type of connection or power supply arrangement.

Figure 3:
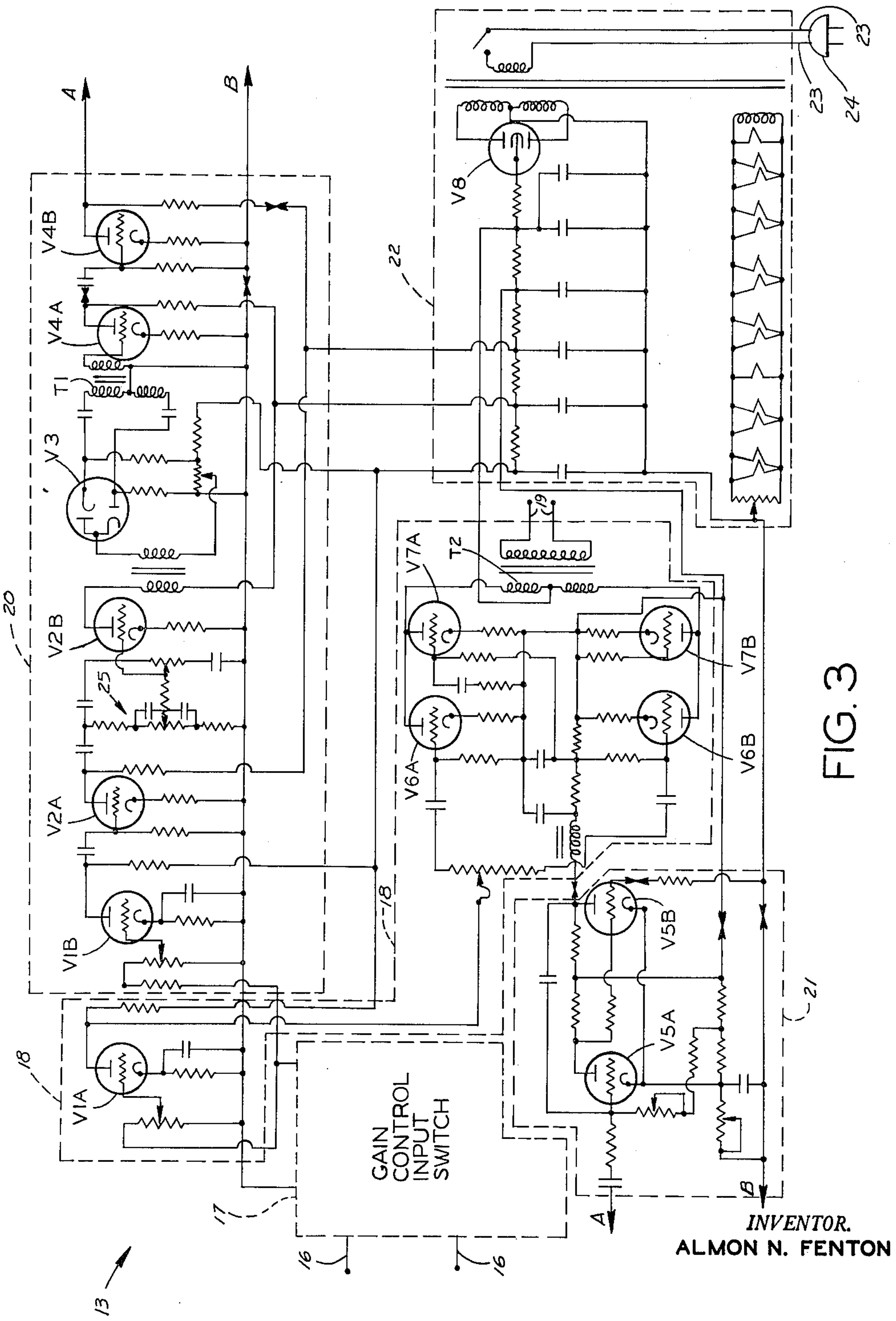
FIG. 3 is a view showing typical exemplary electrical schematic circuit arrangements for certain of the portions of the electronic gating apparatus shown in block form in FIG. 2. However, the input gain control is still shown in block form since such gain control means are well known in the art.

FIG. 3 illustrates in greater detail typical exemplary circuit arrangements for the block diagram form of the invention shown in FIG. 2, except for the gain control and input switch 17, which is entirely conventional and, therefore, thought to be unnecessary to illustrate in detail.

With reference to the first channel, the output of the gain control and input switch 17 is amplified by electron tubes V1B and V2A and associated conventional circuitry in cascade, after which the amplified signal is passed through a common type of tone control circuit, indicated generally at 25, after which the signal is amplified again by electron tube V2B and associated conventional circuitry. The amplified signal is then impressed on two oppositely connected back-biased diodes contained in a common envelope, as indicated at V3, and including associated conventional balanced circuitry, said back-biased diodes being so connected and so balanced that they will not pass the signal until the impressed voltage is greater than the extent of the back bias provided by the associated circuitry connected to the diodes V3. This establishes a threshold of a predetermined magnitude. In other words, this establishes the minimum level of the information or signal which is desired to be through-passed by the complete electronic gating apparatus as indicated at 13 in FIG. 1 to the next succeeding element in the complete sound recording system. Any signal of greater level than this predetermined magnitude or minimum value will pass through, and any signal less than this predetermined magnitude or minimum level will be effectively rejected and will not pass through. In the event that the signal impressed on the back-biased diodes V3 is greater than said predetermined magnitude or minimum level, the passed signal is then put through a transformer T1, which is so connected as to double the frequency, thereby comprising a frequency doubler or multiplier, after which the frequency doubled signal is amplified in electron tubes V4A and V4B and associated conventional circuitry, in cascade. It should be clearly noted that the apparatus just described beginning with the back-biased diodes V3 and associated circuitry effectively comprise triggering means for the high frequency bias signal-producing generator means indicated in block diagram form at 21. The amplified signal from V4B is then connected (through diagrammatic junctions A and B) with respect to the electron tube V5A, which comprises one tube of a monostable multivibrator including the electron tubes V5A and V5B and associated circuitry interconnecting same in a conventional manner. V5A is effectively biased by the associated circuitry to draw plate current in the absence of an input impressed signal thereon from V4B. This is the normal stable condition of the monostable multivibrator 21, and V5B does not draw plate current when in this condition. A negative-going incoming signal from V4B to V5A disturbs the balance of the multivibrator and causes V5B to draw plate current. The associated circuitry is adjusted so that the multivibrator wants to return to the normal state referred to above, but cannot do so as long as a negative voltage is impressed on the grid V5A. When this condition first comes into existence, the multivibrator begins to oscillate and will continue to do so as long as this condition exists. When this occurs, a voltage is developed across the plate resistor of V5B and remains in existence as long as V5B is conducting. It is this voltage that is used to activate the second or gated channel by connection to the gate-opening means embodied within the composite element shown in block form at 18.

With reference to the second channel, the gain control and input switch 17 is connected to an electron tube amplifier V1A and associated conventional circuitry, after which the amplified signal is connected to tubes V6A and V6B, with the inputs thereto the same but with their outputs connected in opposition in transformer T2 by the interconnecting electric circuitry. It should be noted that these elements just referred to effectively comprise signal-splitting and signal-bucking or opposing means adapted to effectively split the signal into two equal portions and to oppose them to each other whereby to effectively cancel same. Thus, a low level input signal below the hereinbefore-mentioned predetermined magnitude or minimum level is balanced out in the transformer T2. However, when an activating voltage is obtained from the activating channel including the elements shown in block form at 20 and 21, V6B is biased beyond cut-off, which allows one of the split portions of the signal to be amplified by V6A and to be passed to the output terminal means 19 through one-half of the output transformer T2, since it is not opposed by the other half of the signal which is now not present in the transformer T2. V7A has its grid circuit adjusted to the same time constant as V6B, and since V7A is in opposition to V6B in the output, any disturbance in the common grid circuit to V6B and V7A will be cancelled out. V7B is used only to balance the plate current in the transformer T2.

The time constant of all operating circuits in the activating channel including the elements shown in block form at 20 and 21, after the threshold is established, as well as in the balanced electronic gate means and the gate-opening means embodied in the element shown in block form at 18, are kept at a minimum or established for optimum operation.

Figures 4, 5:
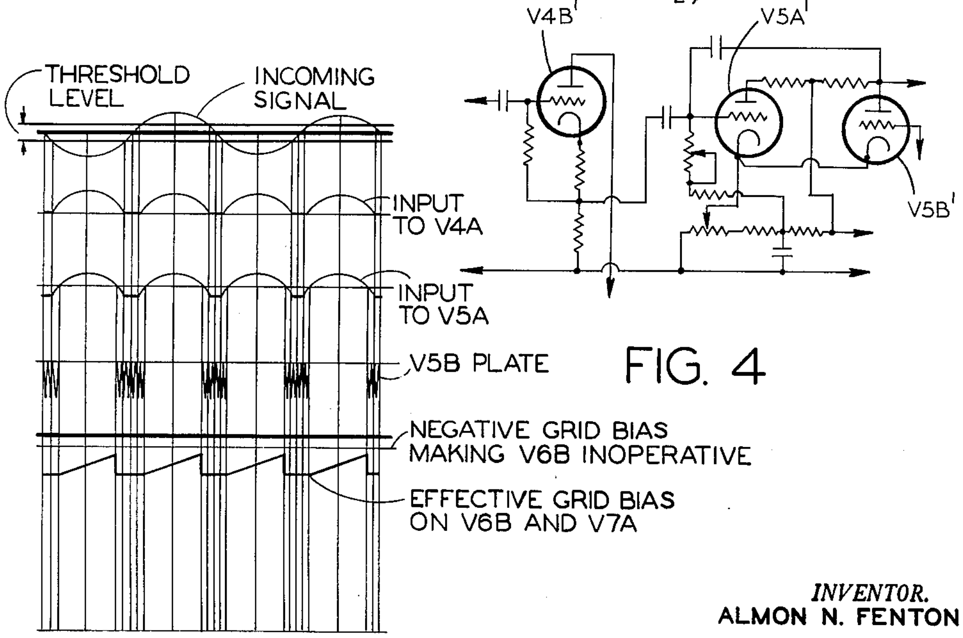
FIG. 4 is an electrical schematic view illustrating a modified portion of the electronic gating apparatus shown in FIG. 3, comprising the portion interconnecting the triggering means and the high freqeuncy bias signal-producing generator means.
FIG. 5 is a composite graphic presentation of various electrical values at different locations throughout the apparatus selected because they facilitate understanding of the operation of the apparatus when considered in the light of the following detailed description thereof.

FIG. 4 illustrates a slight modification of the interconnection of V4B of FIG. 3 with respect to the monostable multivibrator 21 including V5A and V5B and associated circuitry. In this modification, the corresponding electron tubes are indicated by the same reference characters, primed. It will be noted that in this modification V4B′ is provided with associated circuitry and is so connected with respect thereto as to comprise a cathode follower circuit having all of the advantages thereof. It should be noted that the arrow heads of various portions of the coupling circuit shown in FIG. 4 are adapted to be inserted into the circuitry shown in FIG. 3 where the oppositely directed arrow heads touch each other.

FIG. 5 is a composite graphic presentation illustrating the signal at various locations throughout the apparatus, illustrating the threshold level, illustrating the high frequency bias signal, and illustrating the negative grid bias on V6B to make the tube inoperative when the input signal exceeds the predetermined minimum value or magnitude. The various electric signal and bias signal graphic presentations shown in FIG. 5 are clearly indicated on the graph in a manner requiring no additional explanation in the light of the foregong detailed description of one exemplary form of the invention and one slight modification of a portion thereof.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent method steps, combination of method steps, and constructions employed in practicing same and embodying the basic teachings and inventive concept of the present invention.

I claim:

1. A method of gating an intelligence-carrying signal of substantial bandwidth, as determined by the bandwidth requirements for an electrical signal corresponding to a sound passage, comprising the steps of: splitting said intelligence-carrying signal of substantial bandwidth into two portions; mixing said two portions of said intelligence-carrying signal of substantial bandwidth in phase opposition and effecting corresponding cancellation thereof; and, in response to the reaching of a pre-selected threshold value by said intelligence-carrying signal of substantial bandwidth, controllably eliminating one of said two phase opposed portions of said intelligence-carrying signal of substantial bandwidth and removing it from the phase opposition to the other one of said two portions of said intelligence-carrying signal of substantial bandwidth and through-passing said other one of said two portions of said intelligence-carrying signal of substantial bandwidth for output utilization.

2. A method of gating an intelligence-carrying signal of substantial bandwidth, as determined by the bandwidth requirements for an acousto-electrically transduced sound passage, comprising the steps of: splitting an intelligence-carrying signal of substantial bandwidth, as determined by the bandwidth requirements for an acousto-electrically transduced sound passage, into two equal portions; mixing said two equal portions of said intelligence-carrying signal of substantial bandwidth in phase opposition and effecting cancellation thereof; and, in response to the reaching of a pre-selected threshold value by said intelligence-carrying signal of substantial bandwidth, generating a pulsating gate-opening signal of a frequency greatly in excess of the range of frequencies of said intelligence-carrying signal of substantial bandwidth; and, in response to said pulsating gate-opening signal, controllably eliminating one of said two equal phase opposed portions of said intelligence-carrying signal of substantial bandwidth and removing it from the phase opposition to the other one of said two equal portions of said intelligence-carrying signal of substantial bandwidth and through-passing said other one of said two equal portions of said intelligence-carrying signal of substantial bandwidth for output utilization.

3. A method of gating an intelligence-carrying signal of substantial bandwidth, corresponding to the bandwidth requirements for an acousto-electrically transduced sound passage, comprising the steps of: splitting an intelligence-carrying signal of substantial bandwidth, corresponding to the bandwidth requirements for an acousto-electrically transduced sound passage, into two equal portions; passing said two equal portions of said intelligence-carrying signal of substantial bandwidth through a two-channel electronic gate means having a biasable unidirectional non-linear current-passing gating control device in one channel thereof, mixing said passed two equal portions of said intelligence-carrying signal of substantial bandwidth in phase opposition and effecting cancellation thereof; and, in response to the reaching of a pre-selected threshold value by said intelligence-carrying signal of substantial bandwidth, generating a pulsating biasing gate-opening signal of a frequency greatly in excess of the range of frequencies of said intelligence-carrying signal of substantial bandwidth, and applying said pulsating biasing gate-opening signal to said biasable unidirectional non-linear current-passing gating control device of said electronic gate means in a manner effectively preventing the passage therethrough of the corresponding one of said two equal portions of said intelligence-carrying signal of substantial bandwidth and, therefore, controllably eliminating said corresponding one of said two equal phase opposed portions of said intelligence-carrying signal of substantial bandwidth and removing it from the phase opposition to the other one of said two equal portions of said intelligence-carrying signal of substantial bandwidth and through-passing, with respect to said electronic gate means, said other one of said two equal portions of said intelligence-carrying signal of substantial bandwidth for output utilization.

References Cited by the Examiner

UNITED STATES PATENTS

| | | | |
|---|---|---|---|
| 1,890,543 | 12/1932 | Holden | 325—475 |
| 2,561,772 | 7/1951 | Atwood | 328—114 |
| 2,629,026 | 2/1953 | Kilgore | 325—478 |

ARTHUR GAUSS, *Primary Examiner.*